3,528,961
MONOAZO DYES FROM E-CAPROLACTAM
Roy Miles, Amherst, and Norman L. Anderson, Hamburg, N.Y., assignors to Allied Chemical Corporation, New York, N.Y., a corporation of New York
No Drawing. Filed Aug. 16, 1966, Ser. No. 572,675
Int. Cl. C09b 62/00, 62/44, 62/82
U.S. Cl. 260—162                                    8 Claims

ABSTRACT OF THE DISCLOSURE

Monoazo dyestuffs and metal complexes thereof derived from E-caprolactam are provided which have a special affinity for polyamide fibers, wool, silk and acrylics resulting in bright dyeings with excellent levelness and lightfastness properties. The dyestuffs are represented by the formula

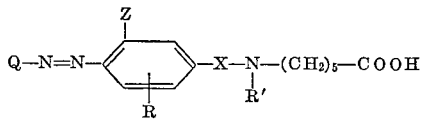

wherein Q is a coupling component; Z is hydrogen or hydroxyl; X is

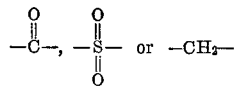

R is hydrogen, lower alkyl, lower alkoxy, chloro, bromo, sulfonamido or nitro and when Z is hydrogen, R' is hydrogen, lower alkyl, phenyl lower alkyl, or benzoyl and when Z is hydroxyl, R' is hydrogen.

---

This invention relates to new monoazo dyestuffs derived from E-caprolactam ("E" being employed herein, including the claims, to represent "epsilon") which are useful as colorants, particularly for polyamide fibers and other nitrogen-containing fibers, such as wool, silk and acrylics.

Due to the presence of both acidic and basic groups in polyamide fibers, they may be colored with many types of dyes; and those most commonly applied are acid, disperse and metallized dyes. However, as is well known, each of these types of dyes has limitations. While dyes of the disperse type produce level dyeings, they generally lack lightfastness. Acid dyes, on the other hand, give colorations which have better wet-fastness and are brighter than disperse dyes, but they usually exhibit relatively poor level dyeing properties (do not cover barré). Similarly, metallized dyes give dyeings of maximum fastness to light and washing, but they suffer from a tendency to dye unevenly and give duller shades than the acid and disperse types.

It is therefore a primary object of this invention to provide new dyestuffs which do not have the above noted disadvantages and which color polyamide and other nitrogenous fibers in bright shades possessing good levelness as well as good fastness to light. Another object of this invention is to provide a process for the manufacture of the above mentioned dyestuffs from E-caprolactam.

These objects are accomplished, in accordance with the present invention, by the provision of a novel class of monoazo dyes represented by the following general formula and certain metal complexes thereof:

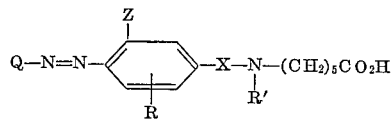

wherein:

Q is a coupling component;
Z is hydrogen or hydroxyl;
R is hydrogen, lower alkyl, lower alkoxy, halogen, sulfonamide or nitro;
R' is hydrogen, lower alkyl, lower aralkyl or acyl, when Z is hydrogen, and is hydrogen when Z is hydroxyl; and
X is

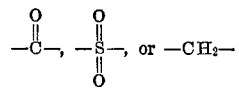

The coupling component Q is preferably an aryl or heterocyclic coupler, such as naphthalene or a pyrazolone derivative, containing a group Y which may be an amino, hydroxyl, or an enolizable carbonyl group, preferably attached to a carbon atom adjacent to that bearing the azo group.

The metal complexes forming a part of our invention are derived from those of the above dyes wherein Z is an OH group and Y is an OH or an enolizable carbonyl group which is adjacent to the azo group.

We have found that said monoazo dyes and said metal complexes give generally bright shades with good to excellent levelness and light fastness when applied to nitrogenous fibers, such as wool, silk and acrylic fibers, and particularly the polyamides.

For use in dyeings, the soluble dyes are applied in neutral or weakly acidic dyebaths, neutral dyeing being generally preferred for polyamide fabrics, particularly carpeting. The insoluble dyes and metal complexes are applied in neutral media as dispersions.

Without limiting our invention to any theoretical considerations, it is probable that the excellent level dyeings obtained with the dyes of the present invention are due to the structural similarity of the E-aminocaproic acid moiety of the dyes to the polyamide substrate. This similarity can provide the mutual affinity by which the dyes become fixed to the fiber.

The novel dyestuffs of our invention can be obtained by diazotizing in the usual manner, an amine of the following formula:

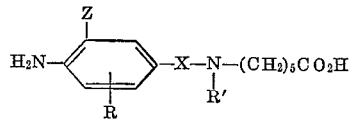

wherein:

Z, X, R and R' are as previously defined and coupling the diazotized amine with a suitable coupling component.

Amines in which Z is hydrogen can be obtained by reacting a p-nitroaromatic compound having an active chloride, such as a p-nitro-benzoyl, -sulfonyl or -toluyl chloride, with a salt of E-aminocaproic acid. Salts of E-aminocaproic acid are readily prepared by boiling E-caprolactam in an alkaline solution, conveniently in a solution of aqueous sodium hydroxide; and usually, the p-nitro-aromatic chloro-compound is added directly to the resulting solution of the E-caproate. The resulting nitro compound obtained upon acidifying the solution thus obtained may be reduced directly to the amine or, alternatively, in order to obtain a product wherein R' in the above formula is other than hydrogen, the resulting nitro compound may be reacted further with a suitable organic (R'A) compound wherein A is a labile halogen, for example, with methyl chloride, benzyl chloride, benzoyl chloride or toluene sulfonyl bromide, and then reduced to the corresponding amine.

Other suitable p-nitro aromatic compounds containing an active chloride which can be reacted with salts of ε-aminocaproic acid to obtain an amine of the above formula wherein Z is hydrogen include:

p-Nitrobenzyl chloride
2-chloro-4-nitrobenzenesulfonyl chloride
2-bromo-5-nitrobenzenesulfonyl chloride
2-ethoxy-5-nitrobenzenesulfonyl bromide
2-methyl-5-nitrobenzenesulfonyl chloride
2-nitro-5-sulfamoylbenzenesulfonyl chloride
2-chloro-6-ethoxy-4-nitrobenzenesulfonyl chloride
3-nitro-2-propyl-5-sulfamoylbenzenesulfonyl chloride Amines in which Z is hydroxyl are conveniently prepared by reacting molten caprolactam with a benzoxazolinone having a reactive halide group, such as benzoxazolinone-6-sulfonyl chloride, followed by treatment with a base which causes cleavage of both the lactam and the oxazolinone rings; acidification of the thus-obtained salt yields the product, as illustrated by the following equations:

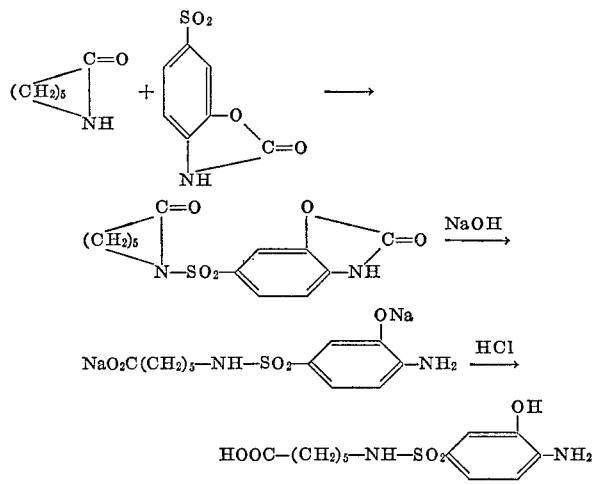

In a similar manner, any other desired diazotizable amine of the above general formula wherein Z is OH can be obtained using the appropriate compound. For example, reaction of caprolactam with benzoxazolinone-6-carbonyl chloride according to the above equations yields an amine wherein X is

Other examples of compounds which can be reacted with caprolactam in this manner include:

6-(α-chloromethyl)-benzoxazolinone
5-chloro-benzoxazolinone-6-sulfonyl chloride
5-t-butyl-benzoxazolinone-6-sulfonyl bromide
4-methoxy-benzoxazolinone-6-carbonyl chloride Examples of coupling components suitable for the preparation of the dyes of this invention include the following:

p-Cresol
Resorcinol
2-naphthol
2,4-pentanedione
1-acetoacetylaminobenzene-4-sulfonic acid
3-hydroxydiphenylamine
1-naphthol-4-sulfonic acid
3-hydroxy-2-naphthanilide (naphthol AS)
6-acetamido-1-naphthol-3-sulfonic acid (acetyl I acid)
8-acetamido-1-naphthol-3,6-disulfonic acid (acetyl H acid)
8-acetamido-1-naphthol-5-sulfonic acid (acetyl S acid)
N-phenyl-8-amino-1-naphthalenesulfonic acid (phenyl acid)
N-p-tolyl-8-amino-1-naphthalenesulfonic acid (tolyl acid)
Sodium 2-naphthol-3,6-disulfonic acid (R salt)
7-hydroxyquinoline 3-methyl-1-phenyl-5-pyrazolone
3-methyl-1-(3-sulfonamidophenyl)-5-pyrazolone
3-methyl-1-(4-sulfophenyl)-5-pyrazolone
1-(2-chloro-5-sulfophenyl)-3-methyl-5-pyrazolone
1-(2,5-dichloro-4-sulfophenyl)-3-methyl-5-pyrazolone
5,5-dimethyl-1,3-cyclohexanedione
4-benzoyl-1,3-cyclohexanedione
1-(2-furyl)-1,3-butanedione
1,1,1-trifluoro-4-(2-thienyl)-2,4-butanedione The metal complexes can be prepared from those of the above dyes wherein both Y and Z are OH groups which are adjacent to the azo group, by metallizing such dyes in the known manner in the presence of a suitable salt; for example, by treatment with salts of metals which are generally capable of forming lakes, such as cobalt, copper, nickel and chromium, iron, zinc, vanadium, mercury and magnesium; preferred metals being those having an atomic weight of 52 to 66.

The following examples describe specific embodiments of the invention and illustrate the best method contemplated for carrying it out; but they are not to be interpreted as limiting the invention to all details thereof, since changes can be made without departing from the scope of the invention. The temperatures are in degrees centigrade, unless indicated otherwise.

EXAMPLE 1

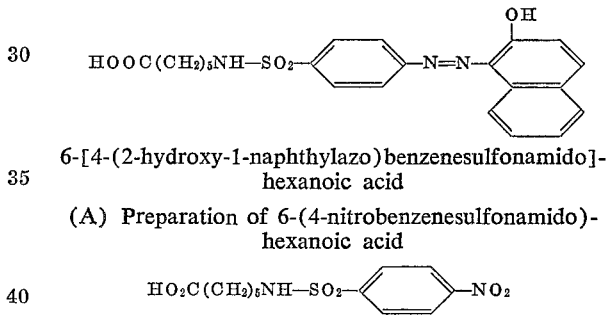

6-[4-(2-hydroxy-1-naphthylazo)benzenesulfonamido]-hexanoic acid (A) Preparation of 6-(4-nitrobenzenesulfonamido)-hexanoic acid $$HO_2C(CH_2)_5NH-SO_2-\langle\phantom{xx}\rangle-NO_2$$

Caprolactam (28.25 g.: 0.25 mol) is refluxed in a solution of sodium hydroxide (20.0 g.: 0.5 mol) in water (300 ml.) for two hours. The solution is then allowed to cool to room temperature, and p-nitrobenzenesulfonyl chloride (55.4 g.: 0.25 mol) is added slowly in portions. The mixture is heated and refluxed for three hours. After filtering to remove any undissolved material, the filtrate is cooled to 15° and is acidified with hydrochloric acid (20° Bé.) until strongly acid to Congo red paper (about 35 ml.). The bright yellow solid is filtered off, washed with water until acid free, and dried. Yield 60.7 g. (76.8%), M.P. 130°.

(B) Reduction of the nitro compound prepared in Part (A) above, to 6-(4-aminobenzenesulfonamido)-hexanoic acid To a slurry of iron (34 g.) in water (150 ml.) at 90° is added slowly a slurry of the above nitro compound (52.66 g.: ⅙ mol) in water (250 ml.) and hydrochloric acid (50 ml. 20° Bé.). The mixture is heated at 90–100° for 2½ hours, then made faintly alkaline phenolphthalein with sodium hydroxide solution. The mass is then heated at 90–95° for an additional two hours. After sludge filtering, the filtrate is acidified with hydrochloric acid (20° Bé.) until faintly acid to Congo red paper. The white precipitate is filtered, washed well with water and dried. After recrystallizing from absolute alcohol there is obtained 37.3 g. (78.3%) of theory of the above named amine melting at 134–135°.

(C) Diazotization and Coupling—Preparation of the dye

The filtered solution of the amine prepared in Part (B) above, (11.44 g., 0.4 mol) in 75 ml. water and 10 ml. of hydrochloric acid (20° Bé.), is cooled to 0°. An aqueous solution of sodium nitrite (2.6 g.) is added over a 10 minute period, the mixture is agitated for 1 hour and then excess nitrous acid is destroyed with sulfamic acid. The diazo suspension is added to a solution of 6.05 g. of 2-naphthol in 70 ml. of water, and 2.3 ml. of 50° Bé. sodium hydroxide and 12 g. of soda ash, over a period of ½ hour at 5°. The product, which is obtained as a bright orange precipitate, is filtered and washed free of excess coupler.

A dispersion of the suction-dried filter cake is prepared by sand grinding with the aid of "Tamol" and "Maraspere N," screening and evaporating to dryness as described more fully below. The orange-red powder thus obtained when applied from an aqueous dye-bath dyes polyamide fabric an orange shade having good levelness.

EXAMPLE 2

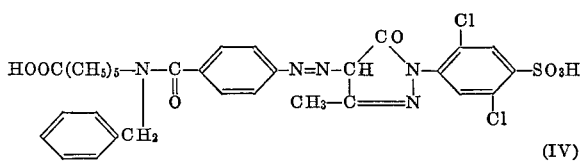

6-{N-benzyl-4-]1-(2,5-dichloro-4-sulfophenyl)-3-methyl-2-pyrazolin-5-one-4-yl-azo]-benzamido}-hexanoic acid (A) Preparation of 6-(4-nitrobenzamido)-hexanoic acid (I)

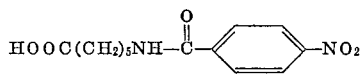

E-caprolactam (113 g., 1 mol) is refluxed in a solution of sodium hydroxide (80 g., 2 mols in 500 ml. of water) for 2 hours. After cooling to room temperature, 4-nitrobenzoyl chloride (185.5 g., 1 mol) is added slowly in portions, allowing each portion to dissolve before adding the next, and maintaining the temperature between 20–30° C. The solution is agitated overnight (16 hours) then filtered to remove any undissolved material. The filtrate is cooled to 15° and acidified with 20° Bé. hydrochloric acid until strongly acid to Congo red paper (about 130 ml. required). The white precipitate is filtered off, washed well with water until acid-free, and dried. Yield: 249 g. (88.9% theory), M.P. 135–138° C.

(B) Preparation of 6-(N-benzyl-4-nitrobenzamido)-hexanoic acid (II)

To a mixture of 450 ml. toluene and 150 ml. anhydrous ethyl alcohol is added 140 g. (0.5 mol) of the nitro compound (I) from (A) and the whole is agitated for ½ hour. α-Chlorotoluene (75.9 g., 0.5 mol+20% excess) is then added slowly over a half hour and the mixture is refluxed for 16 hours. The alcohol and most of the toluene are removed by distillation, then the residue is steam-distilled to remove the remaining toluene and allowed to stand over-night. The white solid which settles out is filtered, washed well with water and dried. Yield: 115 g. (recrystallized from anhydrous ethyl alcohol, 62.1% theory) of (II) pale yellow crystals, M.P. 220–225°.

(C) Reduction of (II) to 6-(N-benzyl-4-aminobenzamido)-hexanoic acid (III)

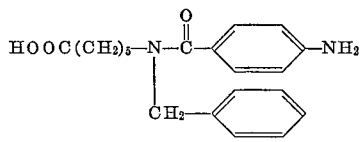

To a slurry of 40 g. iron in 200 ml. water at 90° is added 74 g. (0.2 mol) of (II) slurried in 320 ml. water and 20 ml. hydrochloric acid (20° Bé.) and the mixture is agitated at 90–95° for 2 hours. Soda ash is added until faintly alkaline to phenolphthalein paper and the heating is continued at 90–95° with agitation for 2 hours. The mass is sludge-filtered and the filtrate is acidified with hydrochloric acid to a pH of 4. The pale yellow precipitate so obtained is filtered, washed well with water and dried. After recrystallizing from anhydrous ethyl alcohol, 38.6 g. of (III) is obtained (56.7% of theory), M.P. 222–225°.

(D) Diazotization and coupling—preparation of the dye (IV)

The amine (III) (8.5 g., 0.025 mol) is diazotized substantially as described in Example 1(C). The diazo suspension is coupled into an alkaline solution of the coupler prepared as follows: 8.48 g. (0.025 mol+4–5% excess) of 1-(2,5-dichloro-4-sulfophenyl)-3-methyl-5-pyrazolone is dissolved in 100 ml. water and 1.5 ml. 50° Bé. caustic soda solution and 7.5 g. soda ash. After the coupling is completed, the dye is precipitated by acidifying with HCl to pH of 3, the yellow product (IV) is filtered, washed and dried.

The dye, when applied from aqueous solution, gives a bright yellow dyeing on polyamide fabric with good levelness and good light fastness.

EXAMPLE 3

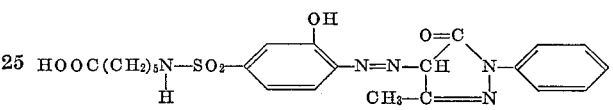

6-[4-(3-methyl-1-phenyl-2-pyrazolin-5-one-4-yl)azo benzenesulfonamido]-hexanoic acid (A) Preparation of 6-(3-hydroxysulfanilamido)-hexanoic acid E-caprolactam (141.2 g., 1.25 mol) is melted to a clear liquid and benzoxazolinone-6-sulfonyl chloride (58.37 g., 0.25 mol) is added slowly in small portions and the mixture is heated carefully to 130°. Heating is continued at 130–135° until the mixture becomes viscous (approx. 2 hours) and then poured quickly into a solution of 300 ml. 50° Bé. caustic soda and 700 ml. water. The temperature is adjusted to 95° and maintained at this for two hours. An additional 50 ml. of 50° Bé. sodium hydroxide is then added and the heating is continued for another hour at 95°. The mixture is allowed to cool to 70° then sludge filtered. The yellow filtrate is carefully acidified with 20° Bé. hydrochloric acid to a faint acid test on Nitrazine Yellow paper. The solution is allowed to stand for about 24 hours during which a pale brown solid separates out. The product is filtered, washed and dried. Yield: 28.2 g., M.P. 255–262° (decomp.).

(B) Diazotization and coupling

The amine product of this example (30.2 g., 0.1 mol) is diazotized in the usual manner and coupled into an alkaline solution of 3-methyl-1-phenyl-5-pyrazolone (18.3 g., 0.105 mol) in 200 ml. water, 5.8 ml. 50° Bé. caustic soda and 30 g. soda ash. After completion of the coupling, the mixture is faintly alkaline to phenolphthalein paper. The orange product is isolated by filtering, washing with a little water and drying. Yield: 28.9 g.

EXAMPLE 4

Metallization

The product from Example 3 (9.74 g., 0.02 mol) is refluxed in dimethylformamide (250 ml.) for one hour. Copper acetate (4.8 g., 0.024 mol) is added and the mixture is refluxed 12 hours. Spot tests show a color change from orange to brick-red on metallization. The metallized product is isolated by pouring the mixture into 700 ml. of hot (70°) water, filtering, washing with 500 ml. water, and drying by suction. The solid content of the press-cake is determined (dry weight of the brick-red copper complex is 8.6 g.) and an aqueous dispersion of the dye is prepared using "Tamol" and "Marasperse N." This aqueous dispersion of the copper metallized dye colors polyamide fabric a reddish yellow having good light fastness and very good levelness properties.

The following tables set out additional specific examples of the class of novel dyestuffs of this invention prepared in the manner set out above from the coupling components and diazo components specified therein, as well as the shade of the dyeings having good levelness and light fastness produced on polyamide fibers. For comparative purposes the above examples are also included in the tables.

a bath containing 1% (on weight of fiber) of "Triton X-100" (an alkylarylpolyether alcohol) at 120° F. for 15 minutes. A dyebath is prepared (using a 30:1 ratio of liquor to fabric) containing 10% anhydrous sodium sulfate and 0.5% (based on fiber weight) of the dye dispersion, and then the bath is heated to 120° F. The fabric is transferred into the dyebath and the temperature is raised to 200–205° F. over a 40 minute period, and the dyeing is run at that temperature for one hour. The fabric is rinsed and dried.

TABLE I

| Coupling component | Diazo component $HO_2C(CH_2)_5NH-X-\langle\bigcirc\rangle-N=NCl$ | | | | | |
|---|---|---|---|---|---|---|
| | X=CO | | X=SO$_2$ | | X=CH$_2$ | |
| | Example No. | Shade | Example No. | Shade | Example No. | Shade |
| B-Naphthol | 5 | Orange | 1 | Orange | 6 | Orange. |
| p-Cresol | 7 | Yellow | 8 | Yellow | 9 | Yellow. |
| 3-methyl-1-phenyl-5-pyrazolone | 10 | do | 11 | do | 12 | Do. |
| Tolyl acid | | | 13 | Violet | | |
| Acetyl H acid | | | 14 | Red | | |
| 3-methyl-1-(3-sulfonamidophenyl)-5-pyrazolone | | | 15 | Yellow | | |

TABLE II

| Coupling component | Diazo component $HO_2C(CH_2)_5\underset{H}{N}-SO_2-\langle\overset{OH}{\bigcirc}\rangle-N=NCl$ | | | |
|---|---|---|---|---|
| | Example No. | Unmetallized shade | Example No. | Metallized [1] shade |
| 3-methyl-1-phenyl-5-pyrazolone | 3 | Yellow | 4 | Reddish yellow. |
| p-Cresol | 16 | do | 17 | Reddish violet. |
| 3-methyl-1-(3-sulfonamidophenyl)-5-pyrazolone | 18 | do | 17 | Orange. |
| 7-Hydroxyquinoline | 20 | Orange | 21 | Violet. |

[1] Copper complex.

TABLE III

| Coupling Component | Diazo component $HO_2C(CH_2)_5-N-\underset{\underset{CH_2}{\|}}{\overset{\overset{O}{\|}}{C}}-\langle\bigcirc\rangle-N=NCl$ | |
|---|---|---|
| | Example No. | Shade |
| B-Naphthol | 22 | Orange. |
| p-Cresol | 23 | Yellow. |
| 1-(2,5-dichloro-4-sulfophenyl)-3-methyl-5-pyrazolone | 2 | Do. |
| 1-naphthol-4-sulfonic acid | 24 | Scarlet. |
| Phenyl acid | 25 | Maroon. |
| Acetyl I acid | 26 | Orange. |
| Acetyl S acid | 27 | Violet. |
| Naphthol AS | 28 | Red. |
| p-Sulfoacetoacetanilide | 29 | Yellow. |
| Acetyl H acid | 30 | Red. |
| 1-(4-sulfophenyl)-3-methyl-5-pyrazolone | 31 | Yellow. |
| 1-(2-chloro-5-sulfophenyl)-3-methyl-5-pyrazolone | 32 | Do. |

EXAMPLE 33

Dyeing procedure

A solid dispersion of the dye is prepared as follows: A weight of filter cake equivalent to 1.0 g. of dry color base, 0.5 g. "Tamol SN" (neutral sodium salt of a complex condensed aryl organic acid), 0.5 g. "Marasperse N" (sodium lignosulfonate), 25 cc. of Ottawa sand, 20–30 mesh, and 125 ml. water are placed in a glass jar on a roller mill and the mixture is sand ground for about 16 hours. After screening (100 mesh screen) the mixture is diluted to 200 ml. with water to give a ½% dispersion. The polyamide fabric is prewetted by immersing in

We claim:
1. A monoazo dye selected from the group consisting of (I) azo compounds represented by the formula

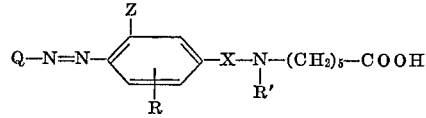

wherein

Q is a coupling component selected from the group consisting of benzene, naphthalene, pyrazole and quinoline containing a group Y which is selected from the group consisting of amino, hydroxyl and carbonyl attached to a carbon atom adjacent to the carbon atom bearing the azo group;

Z is hydrogen or hydroxyl;

X is

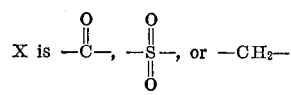

R is selected from the group consisting of hydrogen, lower alkyl, lower alkoxy, chloro, bromo, sulfonamido and nitro; and, when Z is hydrogen, R' is selected from the group consisting of hydrogen, lower alkyl, phenyl lower alkyl, and benzoyl and, when Z is hydroxyl, R' is hydrogen; and (II) metal complexes of said azo compounds, said metal being selected from the group consisting of cobalt, copper, nickel, chromium, iron, zinc, vanadium, mercury and magnesium.

2. A monoazo dye as claimed in claim 1 wherein Z is hydroxyl, Y is hydroxyl and said metal is copper.

3. A monoazo dye as claimed in claim 1 wherein Q is naphthalene, Y is hydroxyl, Z is hydrogen and R' is hydrogen.

4. A monoazo dye as claimed in claim 1 wherein Q is pyrazole, Y is carbonyl, R is hydrogen and R' is benzyl.

5. A monoazo dye is claimed in claim 1 wherein said member is as characterized in (I), Q is benzene, Z is hydroxyl, R is hydrogen and Y is hydroxyl.

6. A monoazo dye having the formula

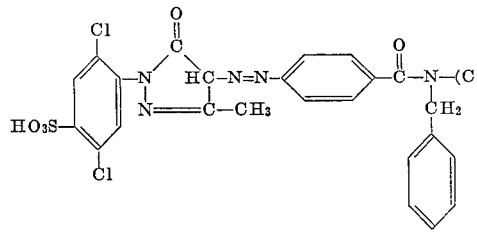

7. A monoazo dye having the formula

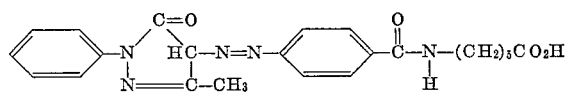

8. A monoazo dye having the formula

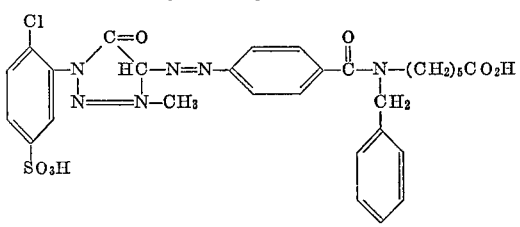

References Cited

UNITED STATES PATENTS

| | | | |
|---|---|---|---|
| 1,555,451 | 9/1925 | Buc | 260—577 |
| 2,304,820 | 12/1942 | Hanford et al. | 260—518 X |
| 2,560,617 | 7/1951 | Weisblat et al. | 260—518 X |
| 2,691,025 | 10/1954 | Clinton et al. | 260—518 X |
| 2,877,220 | 3/1959 | O'Neill et al. | 260—239.3 |

OTHER REFERENCES

Morrison et al., Organic Chemistry, Allyn and Bacon Inc., 1962, pp. 525, 540–41, 556, 570–71, 577–80.

FLOYD DALE HIGEL, Primary Examiner

U.S. Cl. X.R.

8—4, 41; 260—147, 149, 157, 163, 192, 193, 198, 199, 201, 202, 206, 207, 207.1, 239.3, 307, 509, 510

PO-1050
(5/69)

UNITED STATES PATENT OFFICE
CERTIFICATE OF CORRECTION

Patent No. 3,528,961                  Dated September 15, 1970

Inventor(s) Roy Miles and Norman L. Anderson

It is certified that error appears in the above-identified patent and that said Letters Patent are hereby corrected as shown below:

Column 3, lines 19-25, that portion of the second formula reading "$SO_2$" should read -- $SO_2Cl$ --.
Column 4, line 61, -- to -- should be inserted after "alkaline".
Column 8, line 58, "X is" should be deleted.
Column 9, line 6, "is" should read -- as --.

SIGNED AND
SEALED
JAN 26 1971

JAN. 26, 1971

(SEAL)
Attest:

Edward M. Fletcher, Jr.
Attesting Officer

WILLIAM E. SCHUYLER, JR.
Commissioner of Patents